US012811826B2

(12) United States Patent
Goto et al.

(10) Patent No.: US 12,811,826 B2
(45) Date of Patent: Nov. 24, 2026

(54) WIRELESS COMMUNICATION METHOD, WIRELESS COMMUNICATION SYSTEM, AND CONTROL STATION FOR DETERMINING A CHANNEL COMBINATION MAXIMIZING TOTAL CHANNEL CAPACITY BASED ON ESTIMATED CHANNEL INFORMATION AND A PREDICTED EXTERNAL FACTOR

(71) Applicant: NTT, Inc., Tokyo (JP)

(72) Inventors: Daisuke Goto, Musashino (JP); Fumihiro Yamashita, Musashino (JP); Munehiro Matsui, Musashino (JP); Kiyohiko Itokawa, Musashino (JP); Hisayoshi Kano, Musashino (JP); Masaki Shima, Musashino (JP)

(73) Assignee: NTT, Inc., Tokyo (JP)

( * ) Notice: Subject to any disclaimer, the term of this patent is extended or adjusted under 35 U.S.C. 154(b) by 310 days.

(21) Appl. No.: 18/698,270

(22) PCT Filed: Oct. 4, 2021

(86) PCT No.: PCT/JP2021/036669
§ 371 (c)(1),
(2) Date: Apr. 3, 2024

(87) PCT Pub. No.: WO2023/058093
PCT Pub. Date: Apr. 13, 2023

(65) Prior Publication Data
US 2025/0233775 A1 Jul. 17, 2025

(51) Int. Cl.
*H04L 25/02* (2006.01)
*H04B 7/185* (2006.01)
*H04W 64/00* (2009.01)

(52) U.S. Cl.
CPC ..... *H04L 25/0204* (2013.01); *H04B 7/18539* (2013.01); *H04W 64/00* (2013.01)

(58) Field of Classification Search
CPC ........ H04B 7/06; H04B 7/0617; H04B 7/024; H04B 7/026; H04B 7/10; H04B 7/0626;
(Continued)

(56) References Cited

U.S. PATENT DOCUMENTS

2015/0063482 A1* 3/2015 Zhou .................... H04B 7/0482 375/267
2019/0319724 A1* 10/2019 Cordone ............ H04B 7/18508

OTHER PUBLICATIONS

Portillo et al., "A Technical Comparison of Three Low Earth Orbit Satellite Constellation Systems to Provide Global Broadband", Acta Astronautica, vol. 159, Jun. 2019. pp. 1-16.
(Continued)

*Primary Examiner* — Peter Chen
(74) *Attorney, Agent, or Firm* — XSENSUS LLP

(57) ABSTRACT

A wireless communication method according to one embodiment is a method, wherein wireless communication is established between at least one mobile transceiver station provided with a plurality of antennas and a base station provided with a plurality of antennas, the method including: estimating channel information for each of one or more channels based on location information for each of the antennas that transmit and receive radio waves; predicting an external factor affecting each channel for which channel information is estimated; calculating a channel capacity for each channel for which channel information is estimated based on the predicted external factor; determining a channel combination that maximizes the total channel capacity of wireless communication established between the at least one transceiver station and the base station based on each calculated channel capacity; and controlling an orientation
(Continued)

of each antenna for transmitting and receiving radio waves based on the determined combination.

6 Claims, 15 Drawing Sheets

(58) Field of Classification Search
CPC .............. H04B 7/1851; H04B 7/18513; H04B 7/18539; H04B 17/309; H04B 17/318; H04W 16/28; H04W 64/00; H04W 24/02
See application file for complete search history.

(56) References Cited

OTHER PUBLICATIONS

Rossi et al., "System Analysis of Smart Gateways Techniques Applied to Q/V-band High Throughput Satellites", 2014 IEEE Aerospace Conference, 2014, pp. 1-10.
Knopp et al., "Satellite System Design Examples for Maximum MIMO Spectral Efficiency in LOS Channels", IEEE GLOBECOM 2008—2008 IEEE Global Telecommunications Conference, 2008, pp. 1-6.

* cited by examiner

WIRELESS COMMUNICATION METHOD, WIRELESS COMMUNICATION SYSTEM, AND CONTROL STATION FOR DETERMINING A CHANNEL COMBINATION MAXIMIZING TOTAL CHANNEL CAPACITY BASED ON ESTIMATED CHANNEL INFORMATION AND A PREDICTED EXTERNAL FACTOR

CROSS-REFERENCE TO RELATED APPLICATION

The present application is a national stage application, pursuant to 35 U.S.C. § 371, of International Application No. PCT/JP2021/036669, filed Oct. 4, 2021, the contents of which are incorporated herein by reference in their entirety.

TECHNICAL FIELD

The present invention relates to a wireless communication method, a wireless communication system and a control station.

BACKGROUND ART

Since a low Earth orbit (LEO) is an orbit around the Earth below an altitude of 2,000 km, it is closer to the Earth's surface than a geostationary Earth orbit (GEO) and has various advantages for communication systems.

For example, the propagation delay can be greatly decreased by reducing a distance between a satellite and a ground station to 1/10 or less. Further, since the propagation distance is small, the propagation loss is also small. Therefore, facility costs can be saved due to the reduced power consumption of a transmitter and reduced size of the satellite and ground termination station.

Unlike GEO satellites, LEO satellites are always moving when viewed from the ground. Therefore, it is necessary to launch a plurality of satellites and deploy them so as to cover the entire service area in order to offer constant services by the LEO satellite system.

In particular, it is essential to deploy a satellite constellation around the Earth upon development of global service (see, for example, NPL 1).

Additionally, in a case where communication capacity of the ground terminal is increased or the number of accommodated terminals is increased in the LEO satellite service, it is required to have large-capacity lines of a feeder link for exchanging the communication data with the base station.

For increasing the communication capacity, it is desirable to use a high frequency band that enables broadband communication. In the field of satellites, the Ka band of 20 to 30 GHz or the Q/V band of 40 to 50 GHz is under consideration (for example, see NPL 2).

Systems with these bands are greatly affected by rain attenuation, and it is necessary to construct a system that allows communication interruptions during rainfall. As a countermeasure against rainfall, for example, site diversity using a plurality of antennas placed at remote locations has been studied.

Multiple-input multiple-output (MIMO) technology, using multiple antennas to perform spatial multiplexing transmission instead of a single antenna between a satellite and a ground base station, can be adopted as a method to increase communication capacity (for example, see NPL 3).

As described above, it is desirable to employ MIMO technology to increase the communication capacity in satellite communications as well.

CITATION LIST

Non Patent Literature

[NPL 1] I. del Portillo Barrios, B. Cameron, and E. Crawley, "A technical comparison of three low earth orbit satellite constellation systems to provide global broadband," Acta Astronautica, vol. 159, 2019.

[NPL 2] T. Rossi, F. Maggio, M. De Sanctis, M. Ruggieri, S. Falzini and M. Tosti, "System analysis of smart gateways techniques applied to Q/V-band high throughput satellites," 2014 IEEE Aerospace Conference, 2014, pp. 1-10.

[NPL 3] A. Knopp, R. T. Schwarz, D. Ogermann, C. A. Hofmann and B. Lankl, "Satellite System Design Examples for Maximum MIMO Spectral Efficiency in LOS Channels," IEEE GLOBECOM 2008-2008 IEEE Global Telecommunications Conference, 2008, pp. 1-6.

SUMMARY OF INVENTION

Technical Problem

However, for a wireless communication system including mobile stations such as LEO satellites that are constantly moving, conditions such as the communication environment between the ground station and the LEO satellites and the weather fluctuate from moment to moment. Therefore, wireless communication system using conventional satellites could not adopt site diversity and MIMO together.

The present invention has been made to address such a problem stated above, and an object of the present invention is to provide a wireless communication method, a wireless communication system and a control station, each capable of increasing the capacity and stability of wireless communication in a case where a plurality of antennas are used for wireless communication, even when there are external factors affecting each channel.

Solution to Problem

A wireless communication method according to one embodiment of the present invention is a method, wherein wireless communication is established between at least one mobile transceiver station provided with a plurality of antennas and a base station provided with a plurality of antennas, the method including: a channel information estimation step of estimating channel information for each of one or more channels based on location information for each of the antennas that transmit and receive radio waves; an external factor prediction step of predicting an external factor affecting each channel for which channel information is estimated; a channel capacity calculation step of calculating a channel capacity for each channel for which channel information is estimated based on each piece of the estimated channel information and the predicted external factor; a combination determination step of determining a channel combination that maximizes the total channel capacity of wireless communication established between the at least one transceiver station and the base station based on each calculated channel capacity; and an orientation control step of controlling an orientation of each antenna for transmitting and receiving radio waves based on the determined combination.

A wireless communication system according to one embodiment of the present invention is a system, wherein wireless communication is established between at least one mobile transceiver station provided with a plurality of antennas and a base station provided with a plurality of antennas, the system including: a channel information estimation unit configured to estimate channel information for each of one or more channels based on location information for each of the antennas that transmit and receive radio waves; an external factor prediction unit configured to predict an external factor affecting each channel for which channel information is estimated by the channel information estimation unit; a channel capacity calculation unit configured to calculate a channel capacity for each channel for which channel information is estimated by the channel information estimation unit based on each piece of the channel information estimated by the channel information estimation unit and the external factor predicted by the external factor prediction unit; a combination determination unit configured to determine a channel combination that maximizes the total channel capacity of wireless communication established between the at least one transceiver station and the base station based on each channel capacity calculated by the channel capacity calculation unit; and an orientation control unit configured to control an orientation of each antenna for transmitting and receiving radio waves based on the combination determined by the combination determination unit.

A control station according to one embodiment of the present invention is a station that controls wireless communication established between at least one mobile transceiver station provided with a plurality of antennas and a base station provided with a plurality of antennas is a control station including: a channel information estimation unit configured to estimate channel information for each of one or more channels based on location information for each of the antennas that transmit and receive radio waves; an external factor prediction unit configured to predict an external factor affecting each channel for which channel information is estimated by the channel information estimation unit; a channel capacity calculation unit configured to calculate a channel capacity for each channel for which channel information is estimated by the channel information estimation unit based on each piece of the channel information estimated by the channel information estimation unit and the external factor predicted by the external factor prediction unit; a combination determination unit configured to determine a channel combination that maximizes the total channel capacity of wireless communication established between the at least one transceiver station and the base station based on each channel capacity calculated by the channel capacity calculation unit; and an orientation control unit configured to control an orientation of each antenna for transmitting and receiving radio waves based on the combination determined by the combination determination unit.

Advantageous Effects of Invention

According to the present invention, it is possible to increase the capacity and stability of wireless communication in a case where a plurality of antennas are used for wireless communication, even when there are external factors affecting each channel.

DESCRIPTION OF EMBODIMENTS

Figure 1:
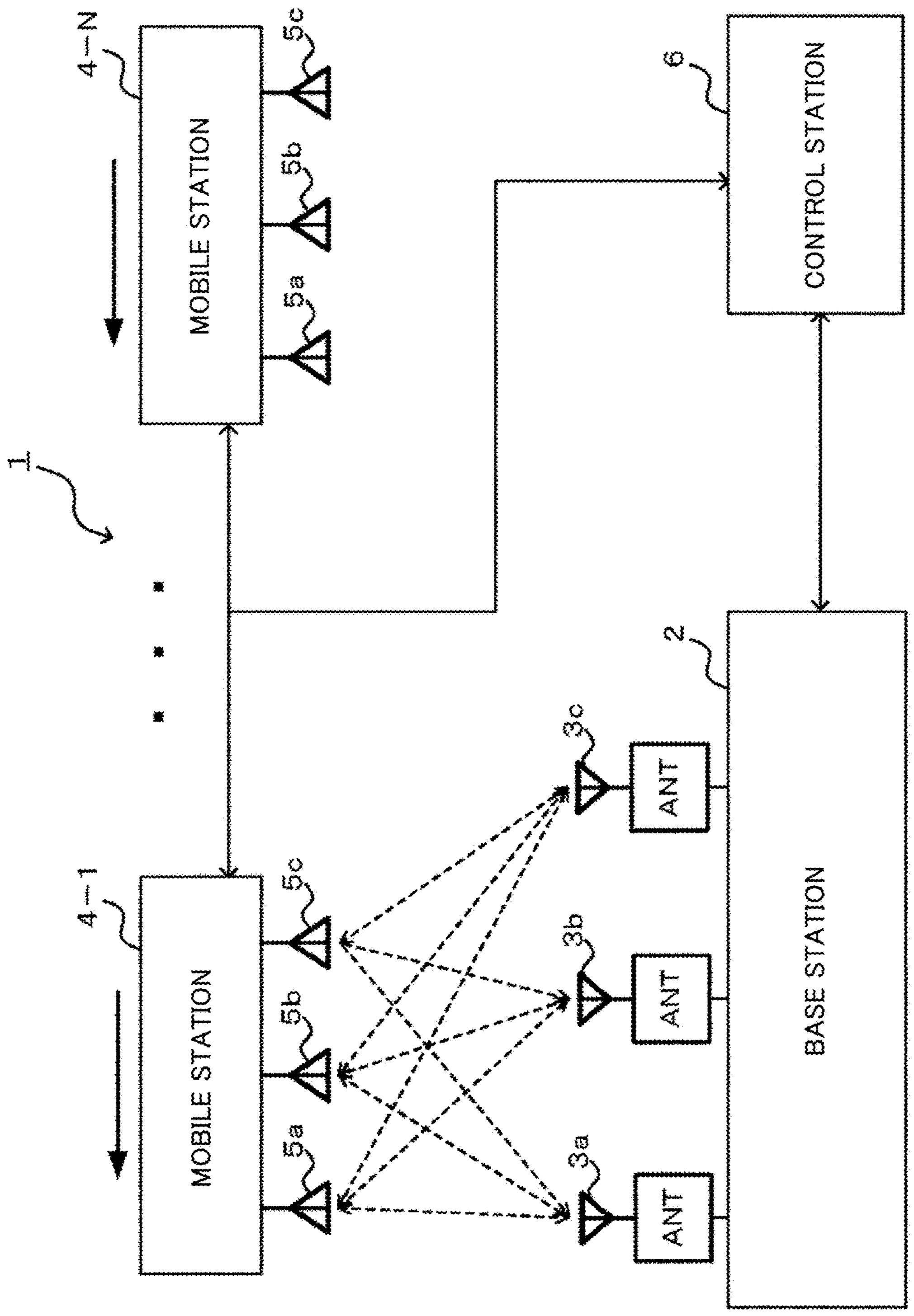
FIG. 1 is a diagram illustrating a configuration example of a wireless communication system according to one embodiment.

Hereinafter, a wireless communication system according to one embodiment will be described with reference to the drawings. FIG. 1 is a diagram illustrating a configuration example of a wireless communication system 1 according to the embodiment. As illustrated in FIG. 1, the wireless communication system 1 according to one embodiment includes, for example, a base station (ground base station) 2, N mobile stations 4-1 to 4-N, and a control station 6. The wireless communication system 1 may not have the control station 6, and functions provided by the control station 6 may be offered by the base station 2, for example.

The base station 2 is equipped with, for example, three antennas 3*a* to 3*c*. The mobile stations 4-1 to 4-N are LEO satellites moving in a service area, for example, each equipped with three antennas 5*a* to 5*c*. The mobile stations 4-1 to 4-N are not limited to LEO satellites, and may be one or more mobile transceiver stations equipped with a plurality of antennas.

At least one of the mobile stations 4-1 to 4-N establishes wireless MIMO communication with the base station 2. At this time, it is assumed that at least one of the base station 2 and mobile stations 4-1 to 4-N has a function of estimating channel information.

The antennas 3*a* to 3*c* of each base station 2 are arranged far enough apart from each other such that differences may occur in the influence of external factors affecting each of the channels, such as rainfall, for example, within the range where communication is available with at least one of the antennas 5*a* to 5*c* provided for each of the mobile stations 4-1 to 4-N.

The control station 6 controls the base station 2 and the mobile stations 4-1 to 4-N by transmitting control information to the base station 2 and the mobile stations 4-1 to 4-N, respectively. In the following description, the mobile stations 4-1 to 4-N are simply referred to as the "mobile stations 4" unless any one of configurations is particularly specified.

Figure 2:
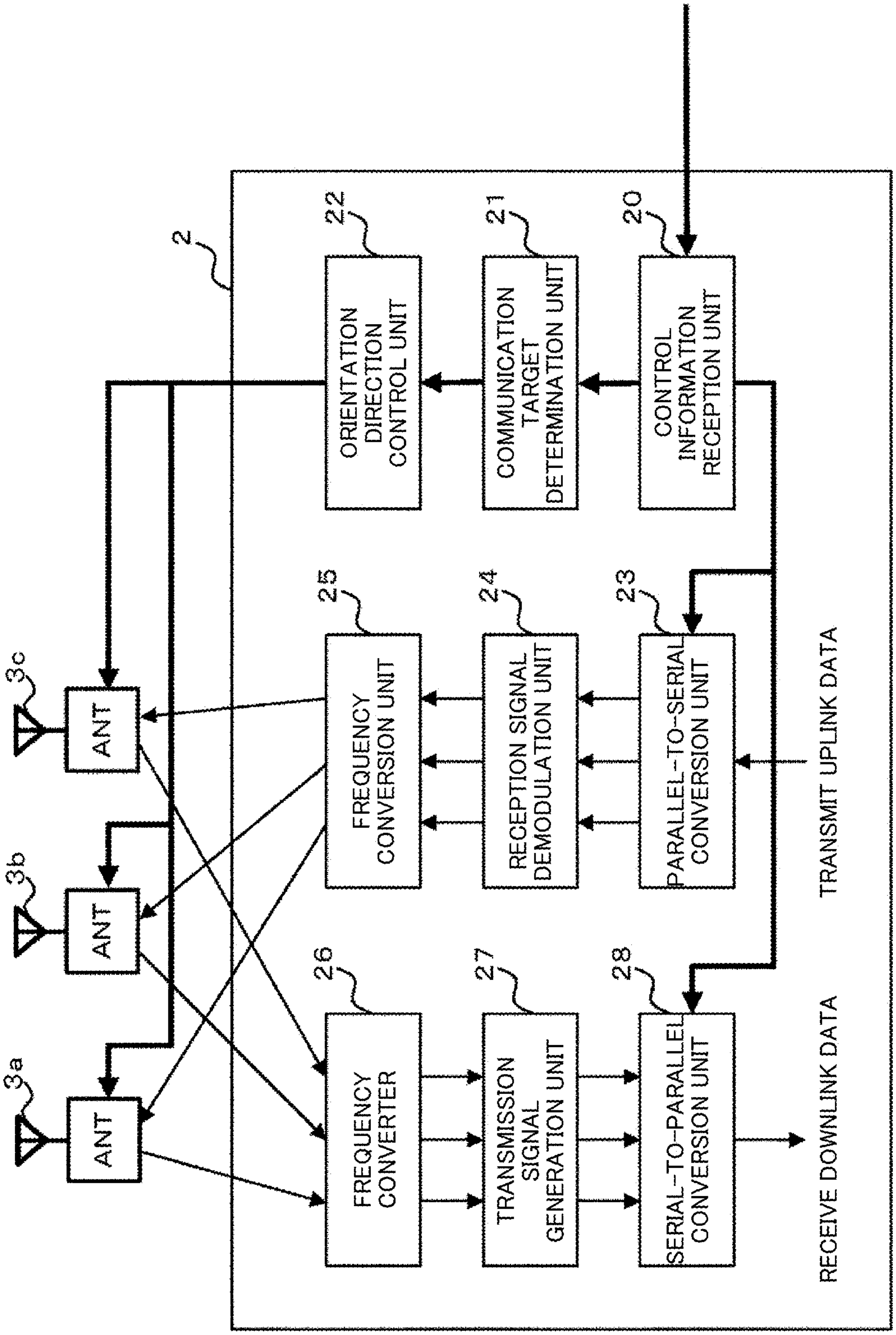
FIG. 2 is a functional block diagram illustrating functions of a base station.

FIG. 2 is a functional block diagram illustrating functions of the base station 2. As illustrated in FIG. 2, the base station 2 includes a control information reception unit 20, a communication target determination unit 21, an orientation direction control unit 22, a parallel-to-serial conversion unit 23, a reception signal demodulation unit 24, a frequency conversion unit 25, a frequency conversion unit 26, a transmission signal generation unit 27, a serial-to-parallel conversion unit 28, and the antennas 3*a* to 3*c*.

The control information reception unit 20 receives control information transmitted by the control station 6 and outputs the control information to the communication target determination unit 21, the parallel-to-serial conversion unit 23 and the serial-to-parallel conversion unit 28.

The communication target determination unit 21 determines at least one of the mobile stations 4-1 to 4-N as a communication target based on the control information input from the control information reception unit 20, and outputs the determined result to the orientation direction control unit 22. In a case where the communication target determination unit 21 determines at least one of the mobile stations 4-1 to 4-N as a communication target, it also determines at least one of the antennas 5*a* to 5*c*.

The orientation direction control unit 22 controls the orientation of at least one of the antennas 3*a* to 3*c* that establish communication with the mobile station 4 (and antenna 5) determined by the communication target determination unit 21. For example, the orientation direction control unit 22 controls the orientation of antennas 3*a* to 3*c* based on location information indicating the locations of mobile stations 4-1 to 4-N at each time.

The parallel-to-serial conversion unit 23 performs parallel-to-serial conversion on bit information of uplink data based on the control information input from the control information reception unit 20, and outputs the converted information to the reception signal demodulation unit 24. The parallel number is the number of connections to the communication target included in the control information.

The reception signal demodulation unit 24 demodulates the bit information input from the parallel-to-serial conversion unit 23 and outputs it to the frequency conversion unit 25. That is, the reception signal demodulation unit 24 has a function of demodulating an electrical signal into a bit string.

The frequency conversion unit 25 converts a frequency of the electrical signal input from reception signal demodulation unit 24 into a radio signal of a predetermined frequency, which is to be transmitted from the antennas 3*a* to 3*c*, and outputs it to the antennas 3*a* to 3*c*.

The frequency conversion unit 26 converts the radio signal input from the antennas 3*a* to 3*c* into an electrical signal of a predetermined frequency and outputs it to the transmission signal generation unit 27.

The transmission signal generation unit 27 modulates the electrical signal input from the frequency conversion unit 26 to generate bit information, and outputs to the serial-to-parallel parallel conversion unit 28.

The serial-to-parallel conversion unit 28 performs serial-to-parallel conversion on the bit information input from the transmission signal generation unit 27 to generate downlink data based on the control information input from the control information reception unit 20. The parallel number is set to the number of connections to the communication target that can be obtained from the control information.

Figure 3:
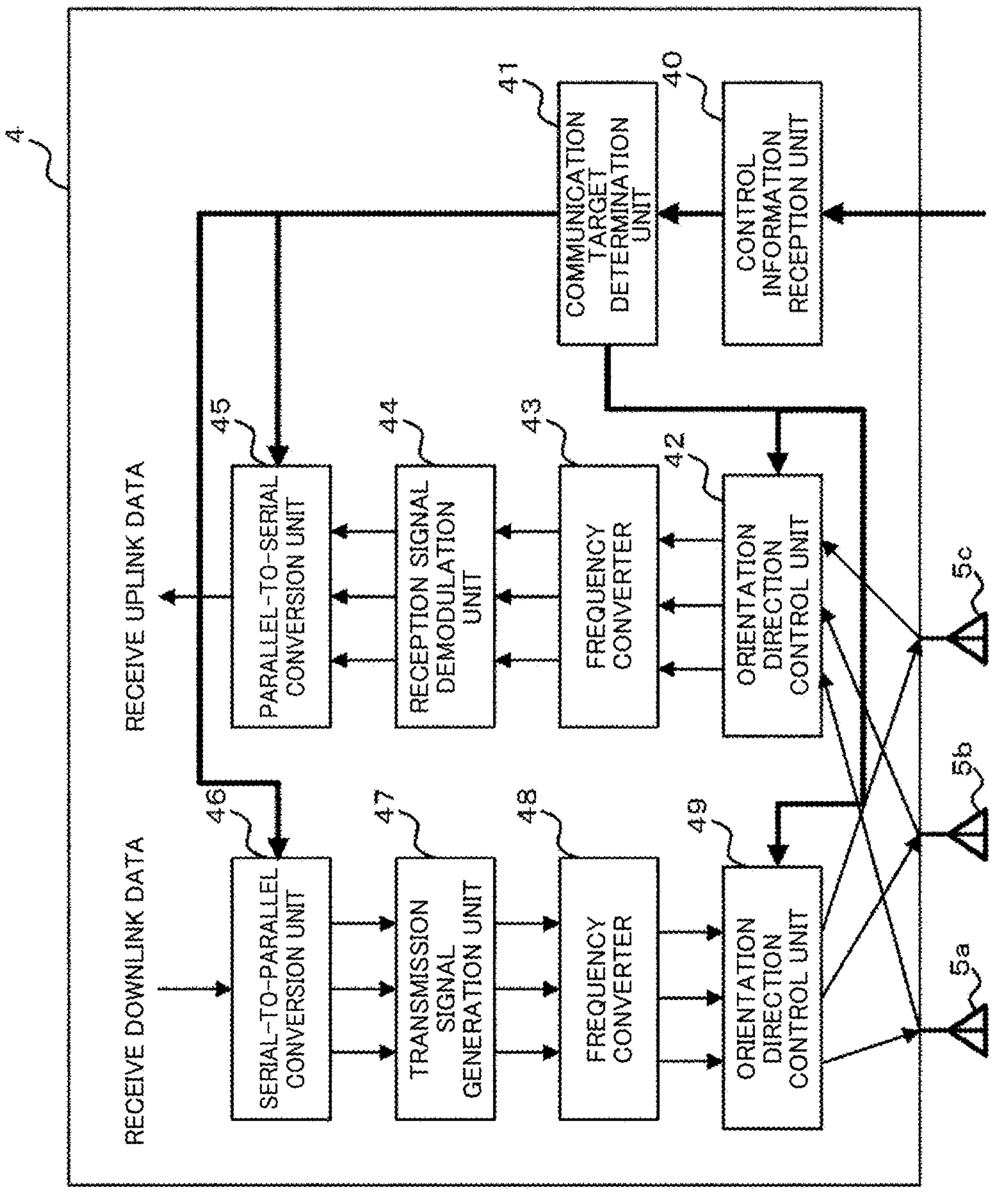
FIG. 3 is a functional block diagram illustrating functions of a mobile station.

FIG. 3 is a functional block diagram illustrating functions of the mobile station 4. As illustrated in FIG. 3, each of the mobile stations 4 includes a control information reception unit 40, a communication target determination unit 41, an orientation direction control unit 42, a frequency conversion unit 43, a reception signal demodulation unit 44, a parallel-to-serial conversion unit 45, a serial-to-parallel conversion unit 46, a transmission signal generation unit 47, a frequency conversion unit 48, an orientation direction control unit 49, and the antennas 5*a* to 5*c*.

The control information reception unit 40 receives the control information transmitted by the control station 6 and outputs to the communication target determination unit 41.

The communication target determination unit 41 determines at least one of the antennas 3*a* to 3*c* of the base station 2 as a communication target based on the control information input from the control information reception unit 40, and outputs the determined result to the orientation direction control unit 42, the parallel-to-serial conversion unit 45, the serial-to-parallel conversion unit 46, and the orientation direction control unit 49.

The orientation direction control unit 42 controls the orientation of at least one of the antennas 5*a* to 5*c* that establish communication with the antennas 3*a* to 3*c* of the base station 2, as determined by the communication target determination unit 41. For example, the orientation direction control unit 42 controls the orientation of antennas 5*a* to 5*c* based on location information indicating the locations of mobile stations 4-1 to 4-N at each time. The orientation direction control unit 42 outputs the radio signal received via the antennas 5*a* to 5*c* to the frequency conversion unit 43.

The frequency conversion unit 43 converts the radio signal input from the orientation direction control unit 42 into an electrical signal of a predetermined frequency and outputs it to the reception signal demodulation unit 44.

The reception signal demodulation unit 44 demodulates the electrical signal input from the reception signal demodulation unit 44 and outputs it to the parallel-to-serial conversion unit 45.

The parallel-to-serial conversion unit 45 performs parallel-to-serial conversion on bit information of data from the communication target determined by the communication target determination unit 41 to generate uplink data. The parallel number is the number of connections to the communication target included in the control information.

The serial-to-parallel conversion unit 46 performs serial-to-parallel conversion on data for the communication target determined by the communication target determination unit 41 and output the converted data to the transmission signal generation unit 47.

The transmission signal generation unit 47 modulates the data input from the serial-to-parallel conversion unit 46 to generate bit information, and outputs it to the frequency conversion unit 48.

The frequency conversion unit 48 converts a frequency of the bit information input from transmission signal generation unit 47 into a radio signal of a predetermined frequency, which is to be transmitted from the antennas 5*a* to 5*c*, and outputs it to the antennas 5*a* to 5*c*.

The orientation direction control unit 49 controls the orientation of at least one of the antennas 5*a* to 5*c* that establish communication with the antennas 3*a* to 3*c* of the base station 2, as determined by the communication target determination unit 41. For example, the orientation direction control unit 49 controls the orientation of antennas 5*a* to 5*c* based on location information indicating the locations of mobile stations 4-1 to 4-N at each time. The orientation direction control unit 49 transmits the radio signal via the antennas 5*a* to 5*c* to the antennas 3*a* to 3*c* of the base station 2.

Figure 4:
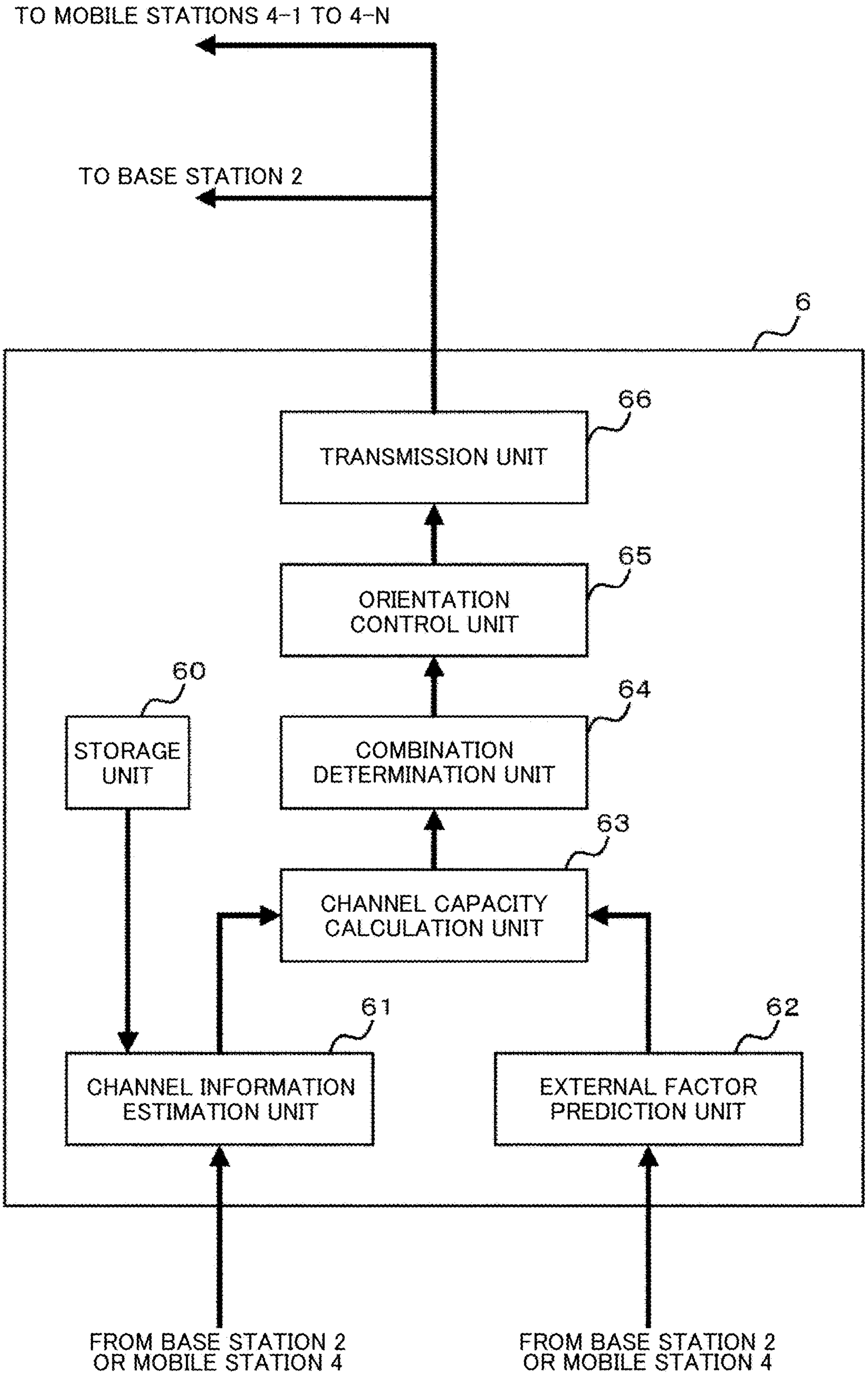
FIG. 4 is a functional block diagram illustrating functions of a control station.

FIG. 4 is a functional block diagram illustrating functions of the control station 6. As illustrated in FIG. 4, the control station 6 has a storage unit 60, a channel information estimation unit 61, an external factor prediction unit 62, a channel capacity calculation unit 63, a combination determination unit 64, an orientation control unit 65, and transmission unit 66.

The storage unit 60 stores, for example, location information indicating the location of each of the mobile stations 4-1 to 4-N at each time. The storage unit 60 may also store examples of external factors (e.g. history) affecting each channel in the wireless communication system 1.

The channel information estimation unit 61 estimates channel information for each of one or more channels based on the location information indicating the location of each of the antennas 5*a* to 5*c* (and the antennas 3*a* to 3*c*), which transmits and receives radio waves, and outputs this information to the channel capacity calculation unit 63. For example, the channel information estimation unit 61 uses location information indicating the location of each of the mobile stations 4-1 to 4-N at each time, which is stored in the storage unit 60.

The channel information estimation unit 61 newly estimates channel information for each channel in a case where a predicted external factor is updated by the external factor prediction unit 62.

The external factor prediction unit 62 predicts an external factor affecting each of the channels for which the channel information estimation unit 61 has estimated the channel information, and outputs the predicted external factor to the channel capacity calculation unit 63.

The channel capacity calculation unit 63 calculates a channel capacity for each of the channels for which the channel information estimation unit 61 has estimated the channel information, based on each channel information estimated by the channel information estimation unit 61 and the external factor predicted by the external factor prediction unit 62, and outputs the calculation result to the combination determination unit 64.

The combination determination unit 64 determines a channel combination that maximizes the total channel capacity of wireless communication established between one or more mobile stations 4 and the base station 2 based on each of channel capacities calculated by the channel capacity calculation unit 63, and outputs combination information indicating determined combinations (combination list) to the orientation control unit 65.

The orientation control unit 65 controls the orientation of each of the antennas 3*a* to 3*c* and antennas 5*a*-5*c*, which transmits and receives radio waves, based on the combination information determined by the combination determination unit 64. For example, the orientation control unit 65 outputs control information for controlling the orientation of each of the antennas 3*a* to 3*c* and the antennas 5*a* to 5*c* to the transmission unit 66.

For the base station 2 and each of the mobile stations 4-1 to 4-N, the transmission unit 66 transmits the control information input from the orientation control unit 65 to the corresponding base station 2 and the corresponding mobile stations 4-1 to 4-N, respectively.

Figure 5:
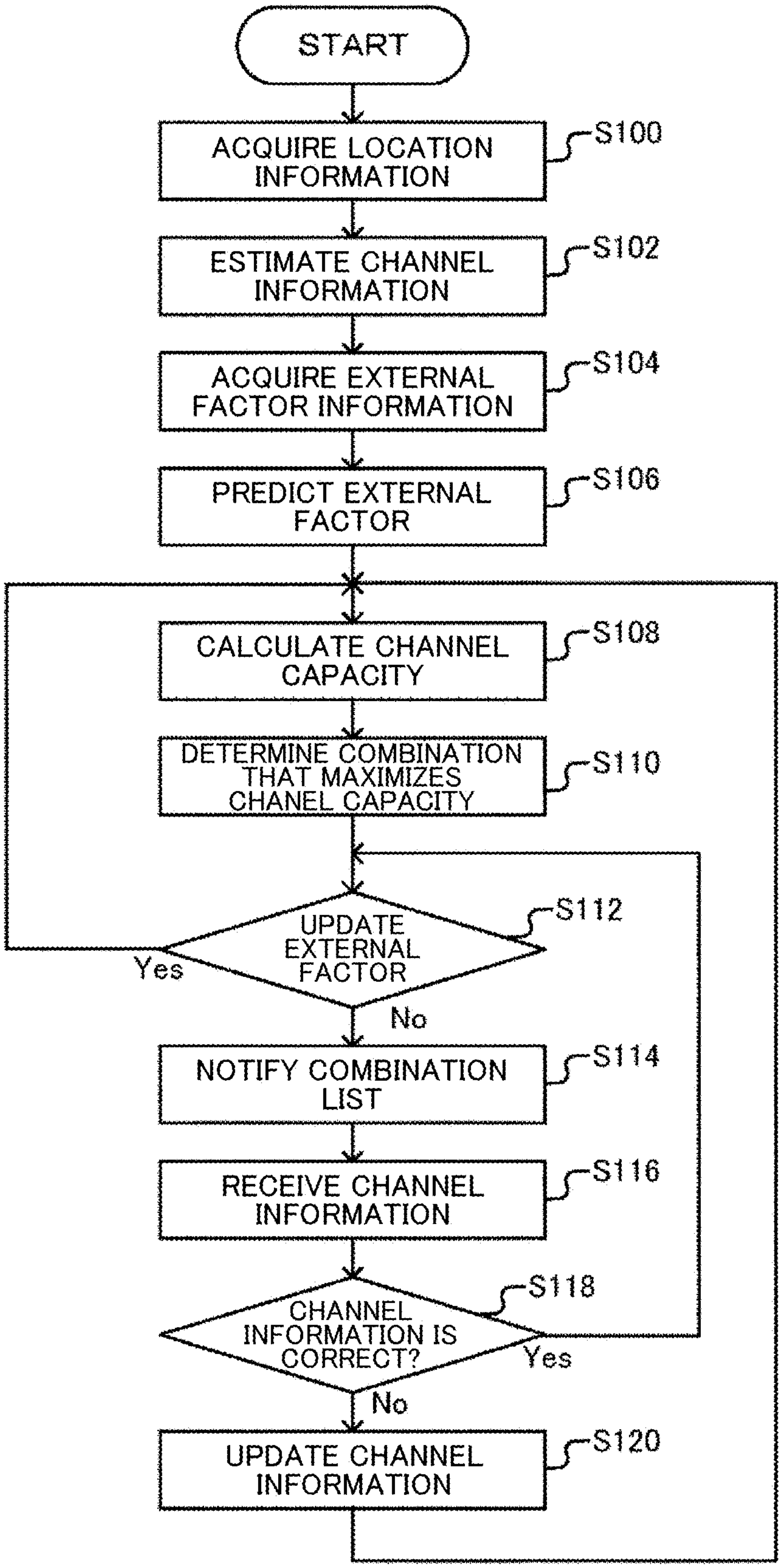
FIG. 5 is a flowchart illustrating an operation example of the control station.

A specific operation example of the wireless communication system 1 will be described hereinbelow. FIG. 5 is a flowchart illustrating an operation example of the control station 6. As illustrated in FIG. 5, the control station 6 acquires location information of the mobile stations 4-1 to 4-N from, for example, the base station 2, the mobile stations 4-1 to 4-N or the storage unit 60 in step 100 (S100).

In step 102 (S102), the channel information estimation unit 61 estimates channel information.

In step 104 (S104), the control station 6 acquires external factor information indicating an external factor affecting a channel such as weather from the base station 2 or the mobile stations 4-1 to 4-N, for example.

In step 106 (S106), an external factor prediction unit 62 predicts an external factor for a current channel, for example.

In a step 108 (S108), the channel capacity calculation unit 63 calculates the channel capacity of each channel between the base station 2 and the mobile stations 4-1 to 4-N.

In a step 110 (S110), the combination determination unit 64 determines a channel combination that maximizes the channel capacity between the base station 2 and the mobile stations 4-1 to 4-N.

In step 112 (S112), the control station 6 checks whether the external factor is updated or not, and if updated (S112: YES), returns to the processing of S108, and if otherwise (S112: NO), proceeds to the processing of S114.

In step 114 (S114), the control station 6 notifies the base station 2 and the mobile stations 4-1 to 4-N of a corresponding combination list.

In step 116 (S116), the control station 6 receives current channel information from the base station 2 or the mobile stations 4-1 to 4-N.

In step 118 (S118), the control station 6 determines whether the channel information estimated in the processing of S102 is correct or not (as compared to the current channel information). The control station 6 returns to the processing of S112 if the channel information is correct (S118: YES), proceeds to the processing of S120 if otherwise (S118: NO).

In step 120 (S120), the control station 6 updates the channel information and returns to the processing of S108.

Figure 6:
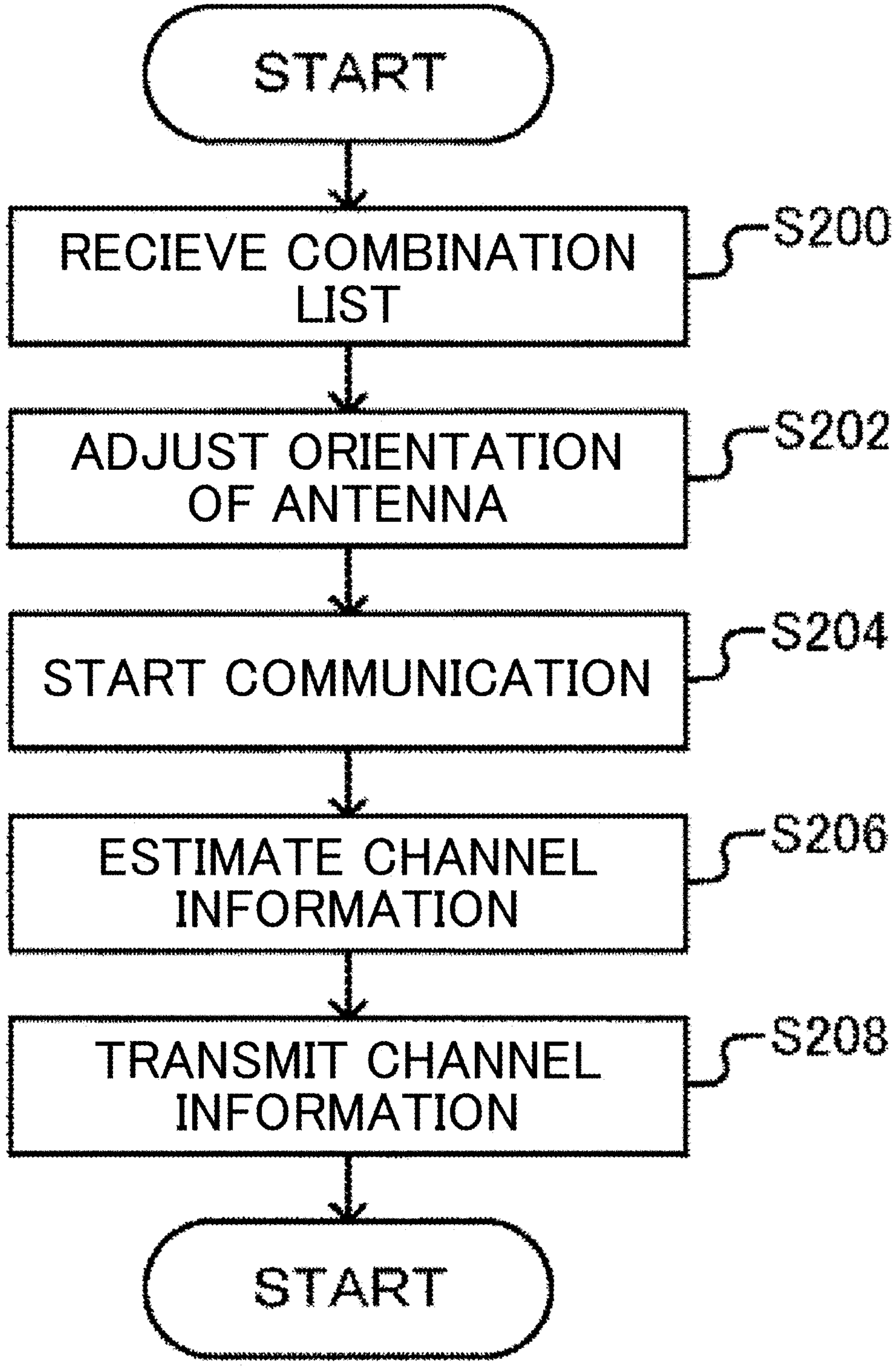
FIG. 6 is a flowchart illustrating an operation example of the base station.

FIG. 6 is a flowchart illustrating an operation example of the base station 2. As illustrated in FIG. 6, the base station 2 receives a combination list from the control station 6 in step 200 (S200).

In step 202 (S202), the base station 2 controls the orientation of the antennas 3*a* to 3*c* based on the combination list.

In step 204 (S204), the base station 2 starts communication with at least one of the mobile stations 4-1 to 4-N using the antennas 3*a* to 3*c* of which orientation is adjusted.

In step 206 (S206), the base station 2 estimates current channel information.

In step 208 (S208), the base station 2 transmits the estimated current channel information to the control station 6.

Figure 7:
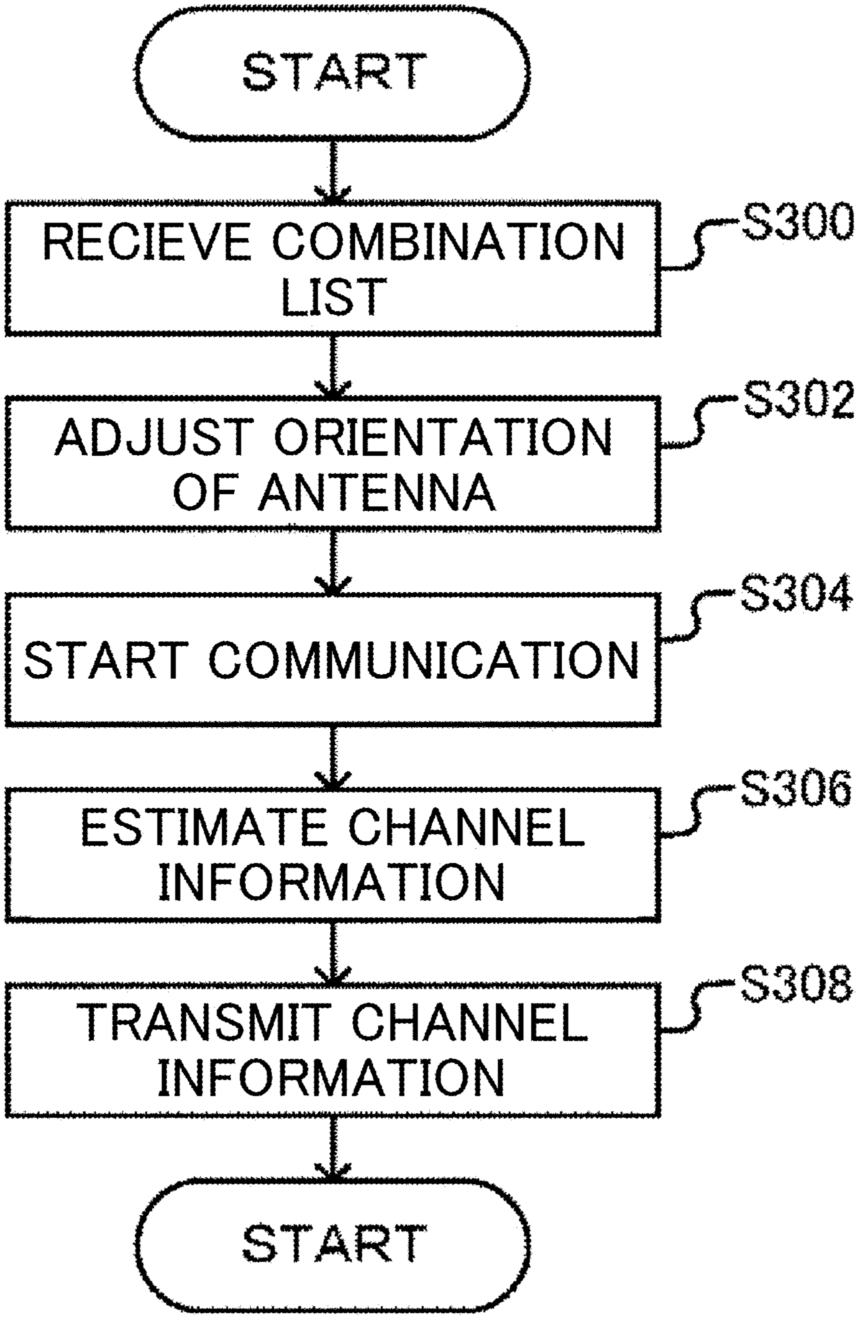
FIG. 7 is a flowchart illustrating an operation example of the mobile station.

FIG. 7 is a flowchart illustrating an operation example of the mobile station 4. As illustrated in FIG. 7, the mobile station 4 receives a combination list from the control station 6 in step 300 (S300).

In step 302 (S302), the mobile station 4 controls the orientation of the antennas 5*a* to 5*c* based on the combination list.

In step 304 (S304), the mobile station 4 starts communication with at least one of the antennas 3*a* to 3*c* of the base station 2 using the antennas 5*a* to 5*c* of which orientation is adjusted.

In step 306 (S306), the mobile station 4 estimates the current channel information.

In step 308 (S308), the mobile station 4 transmits the estimated current channel information to the control station 6.

Figure 8:
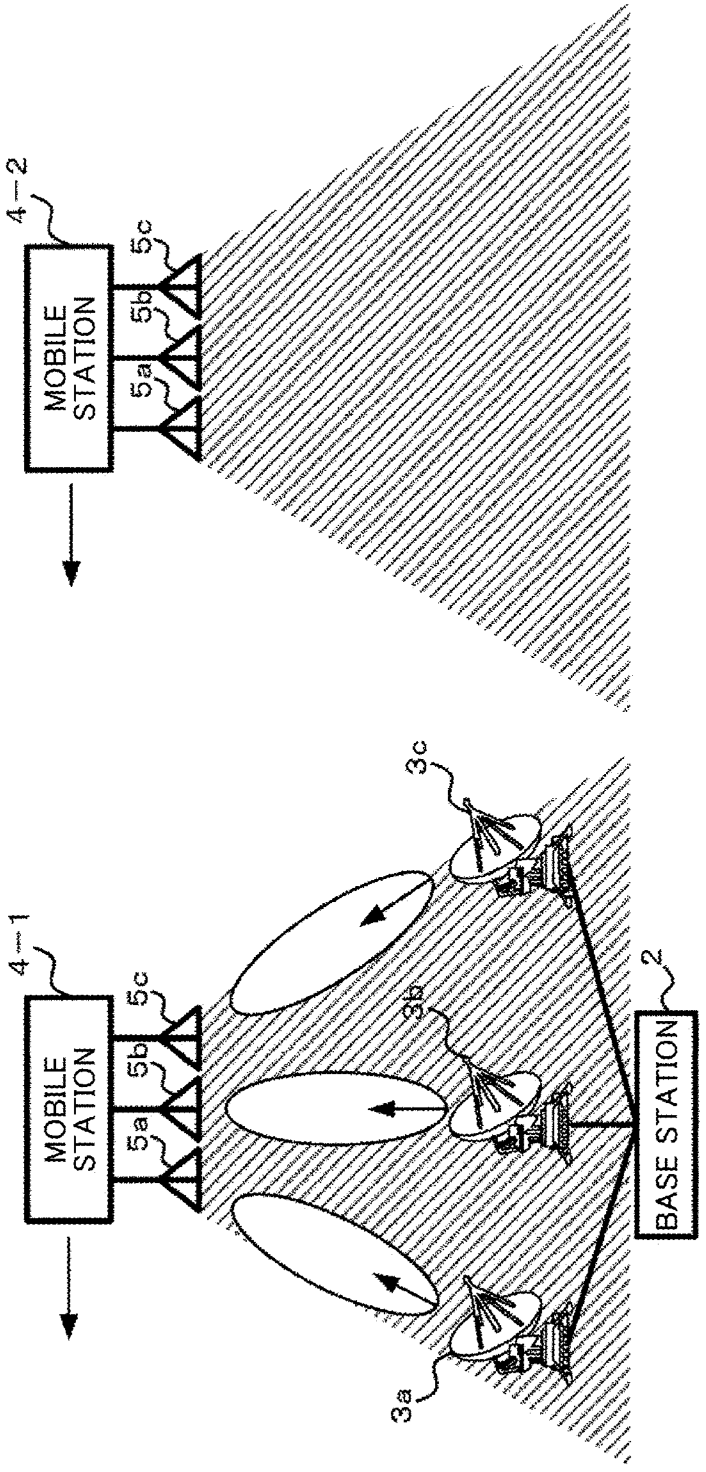
FIG. 8 is a schematic diagram illustrating a configuration example and a first operation example of a wireless communication system.

A configuration example and an operation example of the wireless communication system 1 will be described hereinbelow. FIG. 8 is a schematic diagram illustrating a configuration example and a first operation example of the wireless communication system 1. Hereinafter, the number N of the mobile stations 4 is 1 or 2. Each of the mobile stations 4-1 and 4-2 emits beams in an area indicated by hatched lines, and moves in a predetermined trajectory at a predetermined time. In this embodiment, it is assumed that the functions of the control station 6 are provided in the base station 2.

The mobile station 4 can perform communication within the range of the area indicated by hatched lines. Each of the antennas 3*a* to 3*c* of the base station 2 emits beams having orientation as shown by an ellipse. The antennas 3*a* to 3*c* of the base station 2 are parabolic antennas, for example, and track the mobile station 4 by determining orientation in a single direction.

In this case, all of the antennas 3*a* to 3*c* can establish communication with the mobile station 4-1. That is, the base station 2 sets a communication target for the antennas 3*a* to 3*c* as the mobile station 4-1. The base station 2 notifies the mobile stations 4-1 and 4-2 of information indicating the communication target.

Figure 9:
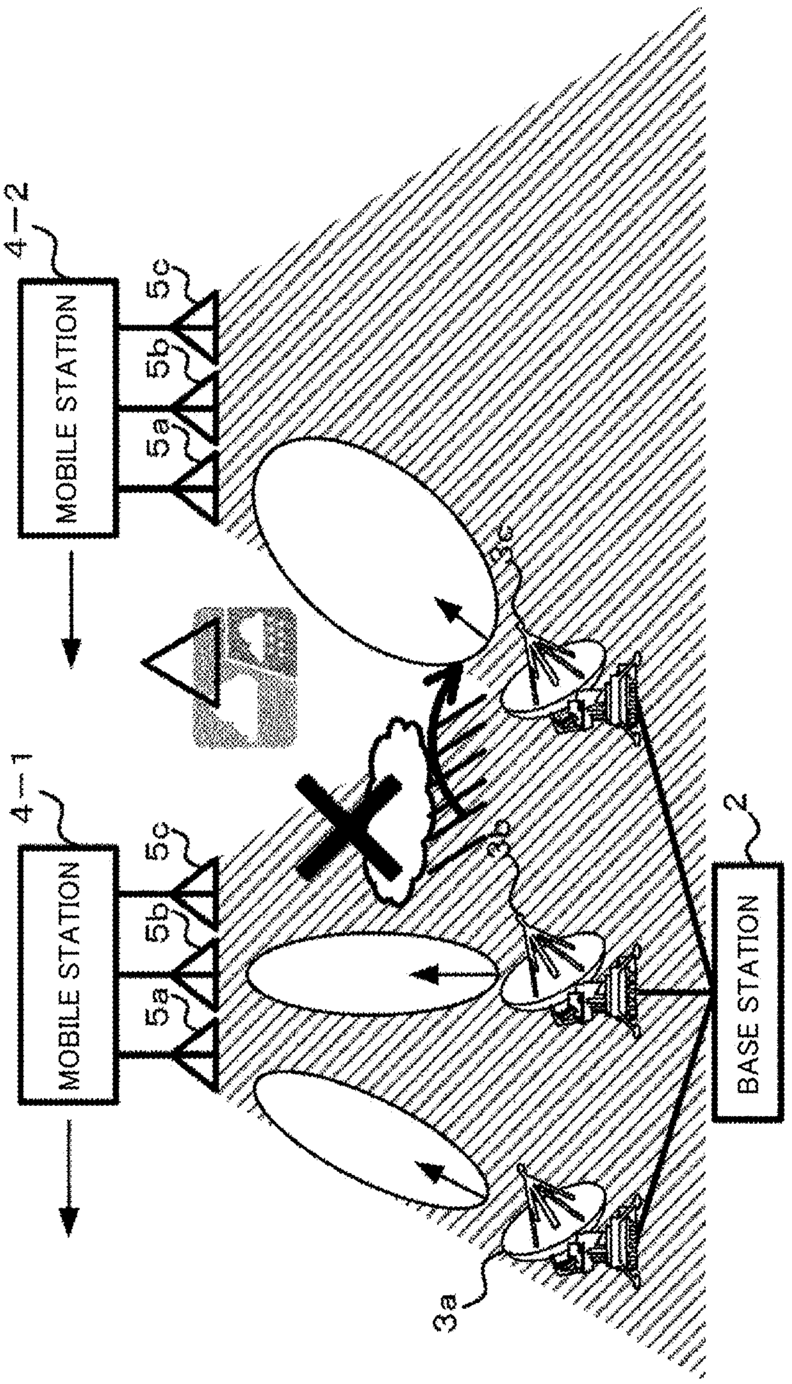
FIG. 9 is a schematic diagram illustrating a second operation example of the wireless communication system.

FIG. 9 is a schematic diagram illustrating a second operation example of the wireless communication system 1. In this case, the antenna 3*c* is located within the range where communication is available with the mobile station 4-2. Furthermore, the communication state between the antenna 3*c* and the mobile station 4-1 is deteriorated due to an external factor (for example, shielding or rain attenuation).

Thus, the base station 2 sets the communication target of the antenna 3*c* as the mobile station 4-2 having the highest communication quality except the mobile station 4-1, based on the location information of the mobile stations 4-1 and 4-2. The base station 2 notifies the mobile stations 4-1 and 4-2 of information indicating the communication target.

The base station 2 directs the orientation of the antennas 3*a* and 3*b* to the mobile station 4-1. Although the number of streams at this time is reduced, allocation of transmission power of the mobile station 4-1 can be concentrated on two antennas 3*a* and 3*b*. Thus, the reception power per stream is improved, and speed-up is enabled by increasing a modulation level. In other words, speed reduction due to the decrease in the number of streams can be minimized.

The mobile station 4-2 directs the orientation only to the antenna 3*c* based on the information received from the base station 2. At this time, since the mobile station 4-2 directs a multiantenna gain to the antenna 3*c*, the gain is improved.

The base station 2 may detect external factors from characteristic deterioration during communication, but if the stability of communication is insufficient, for example, as in a case where weather prediction information is "cloudy, sometimes rainy", a policy to avoid communication with the mobile station 4-1 in advance to secure robustness may be adopted.

Figure 10:
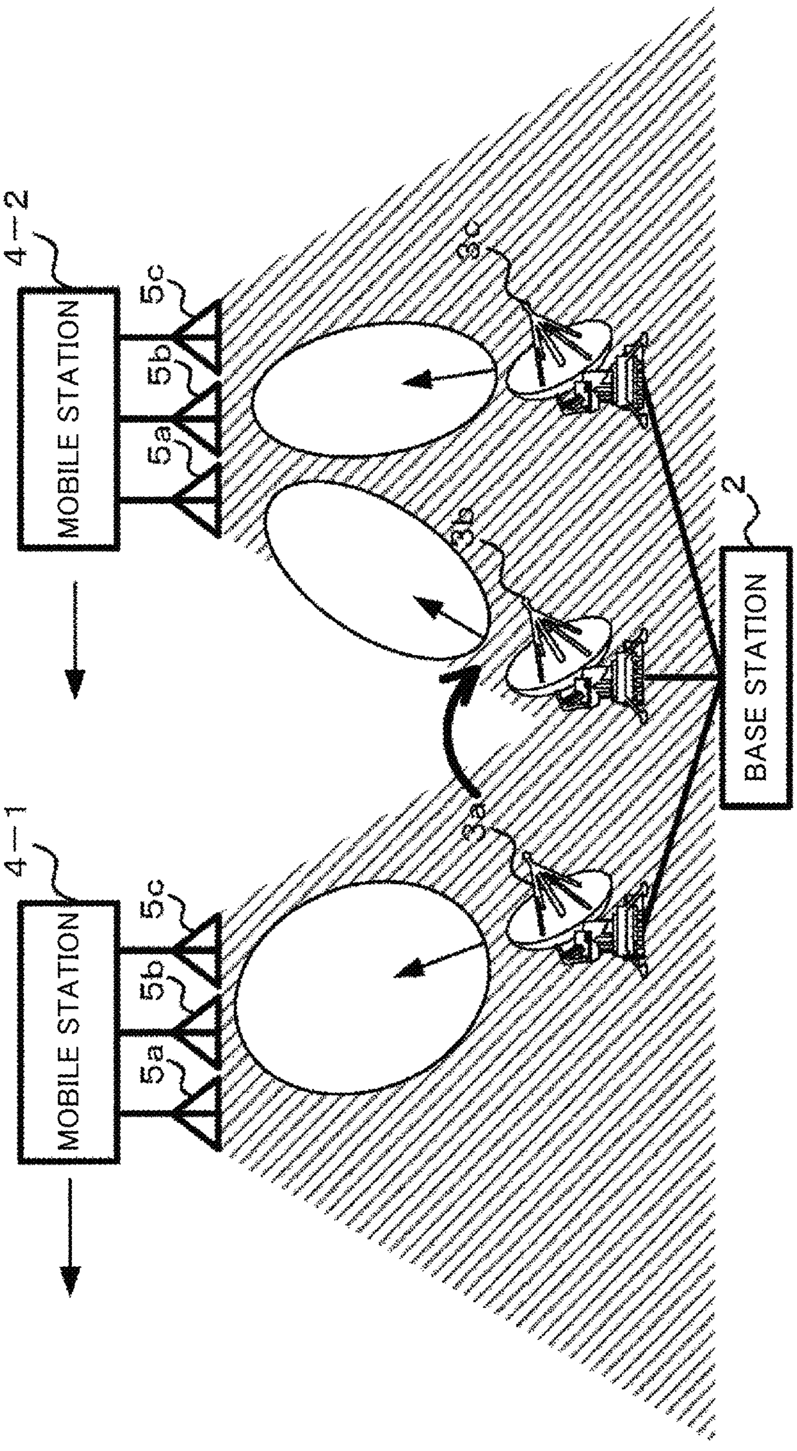
FIG. 10 is a schematic diagram illustrating a third operation example of the wireless communication system.

FIG. 10 is a schematic diagram illustrating a third operation example of the wireless communication system 1. In this case, the mobile station 4-1 moves and communicable areas of the antennas 3*b* and 3*c* are out of a communicable area of the mobile station 4-1.

The antennas 3*b* and 3*c* enter a communicable area of the mobile station 4-2 and a communication distance with the mobile station 4-2 is shorter than a communication distance with the mobile station 4-1.

Only in a case where no external factor exists, the base station 2 sets the communication target of the antennas 3*b* and 3*c* as the mobile station 4-2. The base station 2 notifies the mobile stations 4-1 and 4-2 of information indicating the communication target.

An antenna b directs the orientation to the mobile station 4-2. The mobile station 4-1 directs the orientation only to the antenna 3*a* based on the information received from the base station 2. The mobile station 4-2 directs the orientation to the antennas 3*b* and 3*c* based on the information received from the base station 2.

Figure 11:
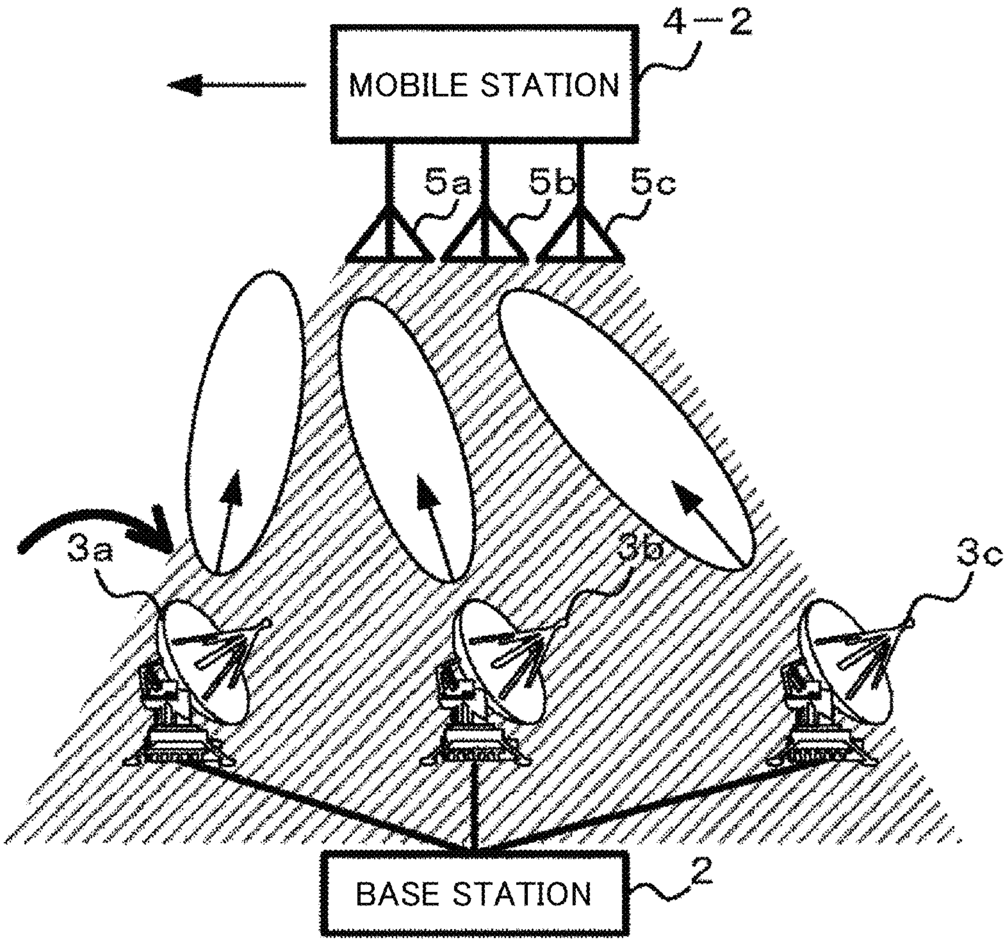
FIG. 11 is a schematic diagram illustrating a fourth operation example of the wireless communication system.

FIG. 11 is a schematic diagram illustrating a fourth operation example of the wireless communication system 1. The mobile station 4-1 is out of the communicable areas of the antennas 3*a* to 3*c*. The base station 2 sets the communication target of all the antennas 3*a* to 3*c* as the mobile station 4-2. The base station 2 notifies the mobile stations 4-1 and 4-2 of information indicating the communication target.

An antenna 3*a* directs the orientation to the mobile station 4-2. The mobile station 4-2 directs all the beams to the antennas 3*a* to 3*c* and performs the transmission of three streams, the same as the mobile station 4-1.

Figure 12:
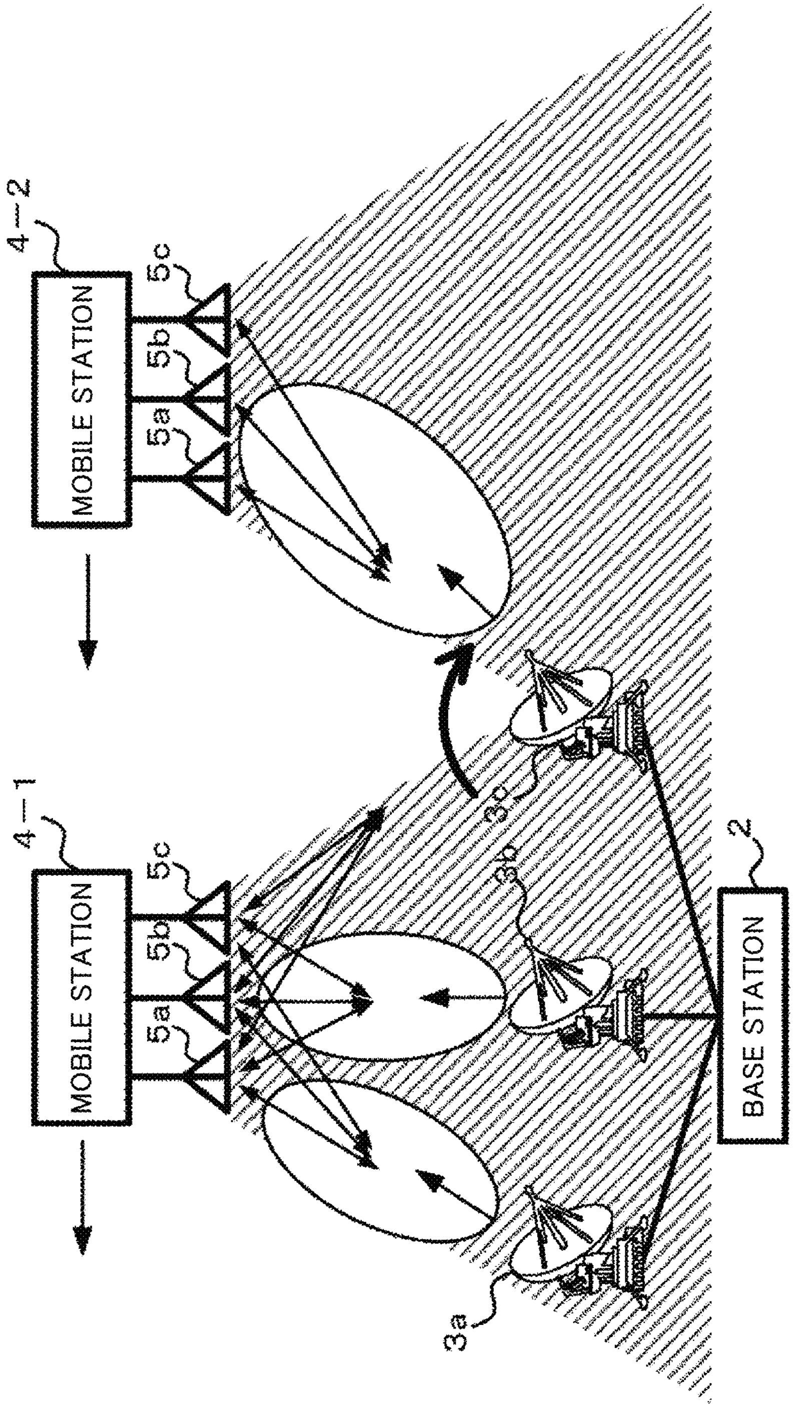
FIG. 12 is a schematic diagram illustrating a fifth operation example of the wireless communication system.

FIG. 12 is a schematic diagram illustrating a fifth operation example of the wireless communication system 1. In this case, the communicable areas of the mobile station 4-1 and the mobile station 4-2 overlap on the antenna 3*c*.

At this time, the antennas 3*a* to 3*c* may be directed to the mobile station 4-1 to form three streams (mobile station 4-1←antennas 3*a*, 3*b* and 3*c*).

Further, the antenna 3*c* may be directed to the mobile station 4-2 (mobile station 4-1-antennas 3*a* and 3*b*; mobile station 4-2←antenna 3*c*).

In this case, the base station 2 performs the following two calculations (Channel Capacity C1)+(Channel Capacity C2) based on the channel information ("CSI") acquired in advance and selects a channel having the largest channel capacity.

(Channel Capacity C1) is calculated using a 3×3 channel matrix between the antennas 3*a* to 3*c* of the mobile station 4-1 and (Channel Capacity C2) is set to 0.

(Channel Capacity C1) is calculated using a 3×2 channel matrix between the antennas 3*a* to 3*b* of the mobile station 4-1 and (Channel Capacity C2) is calculated from a 3-row channel vector between the mobile station 4-2 and the antenna 3*c*.

Figure 13:
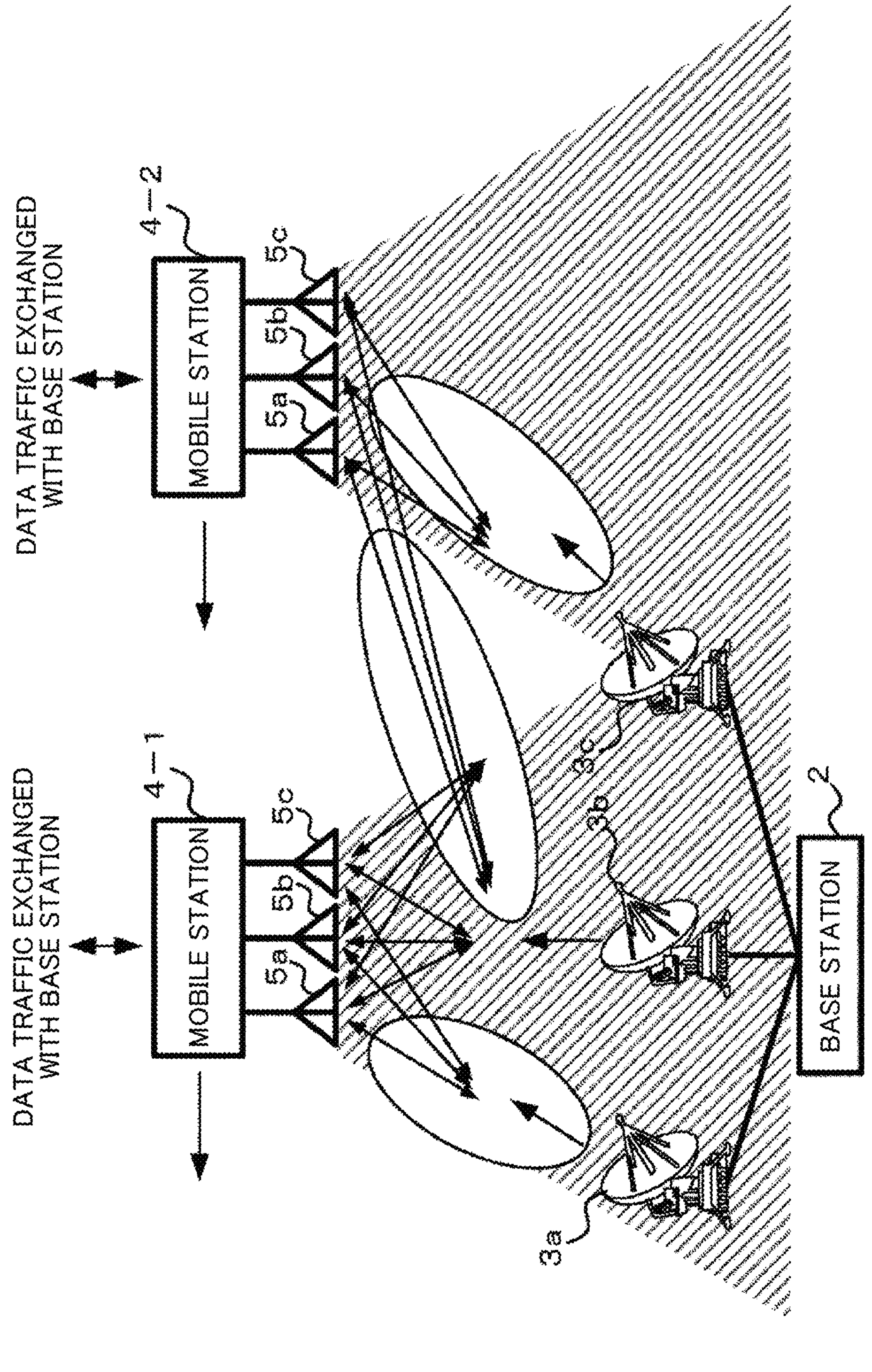
FIG. 13 is a schematic diagram illustrating a sixth operation example of the wireless communication system.

FIG. 13 is a schematic diagram illustrating a sixth operation example of the wireless communication system 1. In addition to the transmission capacity parameters of the fifth operation example of the wireless communication system 1, data traffic sent to and received from the base station 2 handled by each mobile station 4 can be predicted in advance. In this case, the wireless communication system 1 may control the orientation of the antennas 3*a* to 3*c* using the predicted data traffic.

For example, in addition to calculating the time integral of (Channel Capacity C1)+(Channel Capacity C2), the base station 2 performs a subtraction of potential traffic data and selects a higher channel combination as an integral value.

Figure 14:
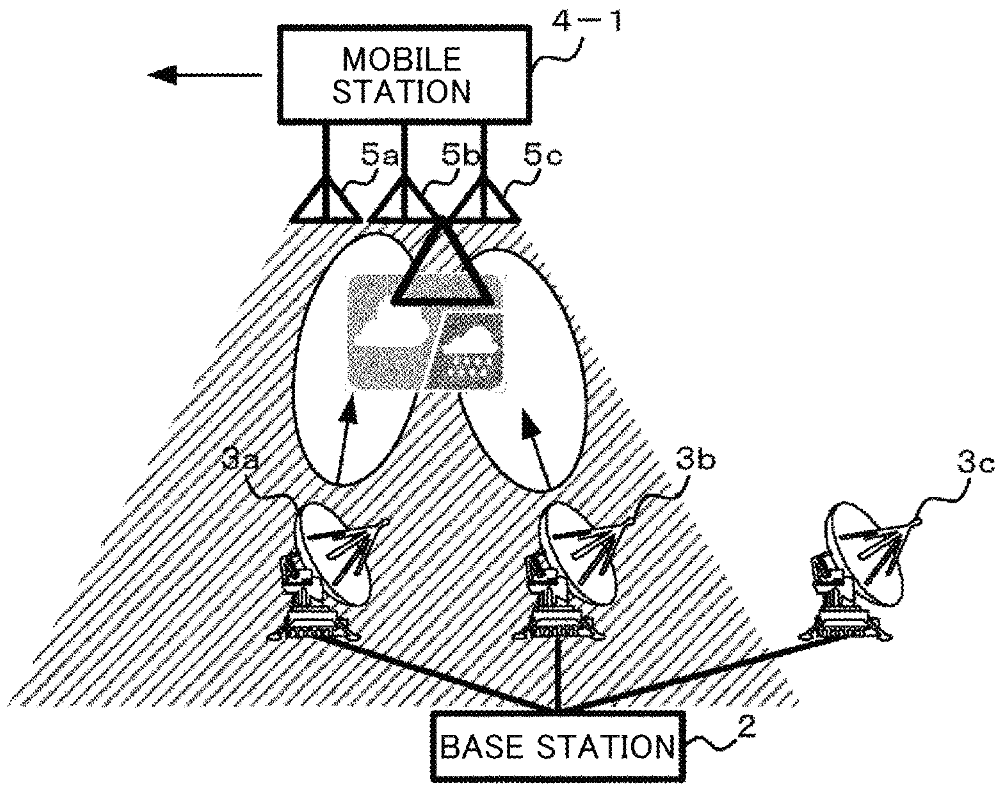
FIG. 14 is a schematic diagram illustrating a seventh operation example of the wireless communication system.

FIG. 14 is a schematic diagram illustrating a seventh operation example of the wireless communication system 1. This example indicates a case where, when the mobile station 4-1 is able to establish communication with antennas 3*a* and 3*b*, external factors may cause unstable connectivity, even if the transmission capacity is higher when either of them forms a single beam, depending on the channel conditions.

In this case, the base station 2 may form a multibeam on both the antennas 3*a* and 3*b* regardless of the communication capacity to obtain a diversity effect. For example, the seventh operation of the wireless communication system 1 is effective particularly when using a high frequency band in which communication interruption is likely to occur due to rain attenuation.

Figure 15:
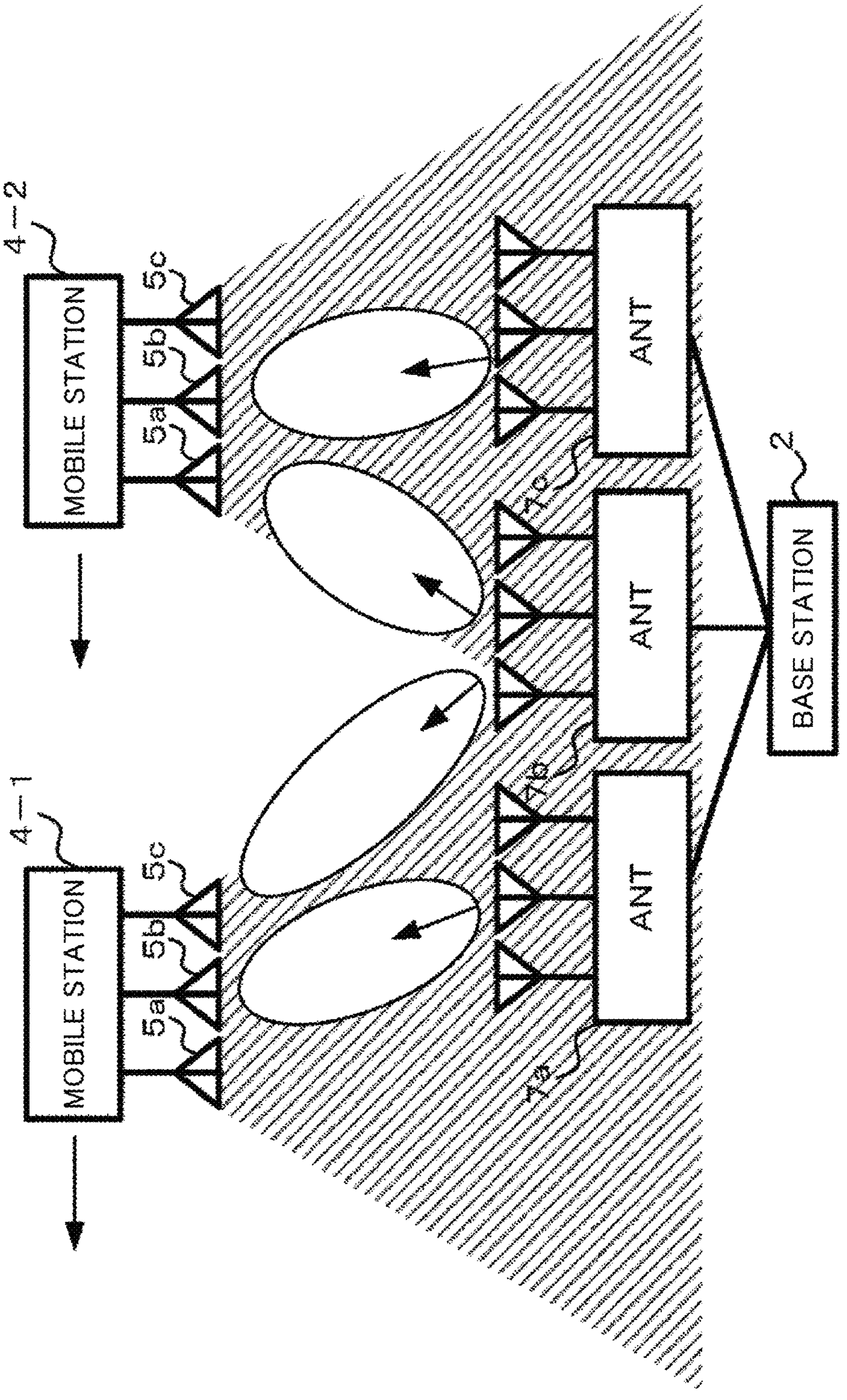
FIG. 15 is a schematic diagram illustrating an eighth operation example of the wireless communication system.

FIG. 15 is a schematic diagram illustrating an eighth operation example of the wireless communication system 1. In this case, the base station 2 has multiantennas 7*a* to 7*c* respectively provided with a plurality of antenna elements and can form a multibeam.

For example, it is assumed that the multiantenna 7*b* belongs to any communicable area of the mobile stations 4-1 and 4-2. Since the multiantenna 7*b* forms a multibeam to make independent beams in both mobile stations 4-1 and 4-2, the maximum channel capacity is selected using the multibeam.

The base station 2 sets the communication target of the multiantenna 7*b* as the mobile stations 4-1 and 4-2. The base station 2 notifies the mobile stations 4-1 and 4-2 of information indicating the communication target.

The multiantenna 7*b* directs the orientation to the mobile stations 4-1 and 4-2. The mobile station 4-1 directs the orientation to the multiantennas 7*a* and 7*b* based on the information received from the base station 2. The mobile station 4-2 directs the orientation to the antennas 3*b* and 3*c* based on the information received from the base station 2.

In this way, the wireless communication system 1 according to one embodiment determines a channel combination that maximizes the total channel capacity of wireless communication established between one or more mobile stations 4 and the base station 2, and controls the orientation of the antennas 3*a* to 3*c* and the antennas 5*a* to 5*c* for transmitting and receiving radio waves based on the determined combination, thus in a case where wireless communication is established using the plurality of antennas, the capacity of wireless communication can be increased and the stability can be improved even if the external factor affecting each channel exists.

Some or all of the functions of the base station 2, the mobile station 4 and the control station 6 may be configured with hardware such as a programmable logic device (PLD) or a field programmable gate array (FPGA) or may be configured as a program that is executed by a processor such as a CPU.

For example, the control station 6 (or the base station 2) according to the present invention can be implemented using a computer and a program, and the program can be recorded on a recording medium or provided via a network.

REFERENCE SIGNS LIST

1 Wireless communication system
2 Base station
3*a* to 3*c* Antenna
4-1 to 4-N Mobile station
5*a* to 5*c* Antenna
6 Control station
7*a* to 7*c* Multi-antenna
20 Control information reception unit
21 Communication target determination unit
22 Orientation direction control unit
23 Parallel-to-serial conversion unit
24 Reception signal demodulation unit
25 Frequency conversion unit
26 Frequency conversion unit
27 Transmission signal generation unit
28 Serial-to-parallel conversion unit
40 Control information reception unit
41 Communication target determination unit
42 Orientation direction control unit
43 Frequency conversion unit
44 Reception signal demodulation unit
45 Parallel-to-serial conversion unit
46 Serial-to-parallel conversion unit
47 Transmission signal generation unit
48 Frequency conversion unit
49 Orientation direction control unit
60 Storage unit
61 Channel information estimation unit
62 External factor prediction unit
63 Channel capacity calculation unit
64 Combination determination unit
65 Orientation control unit
66 Transmission unit

The invention claimed is:

1. A wireless communication method, wherein wireless communication is established between at least one mobile transceiver station provided with a plurality of antennas and a base station provided with a plurality of antennas, the method comprising:

estimating channel information for each of a plurality of channels between the plurality of antennas of the at least one mobile transceiver station and the plurality of antennas of the base station based on location information for each of the plurality of antennas of the at least one mobile transceiver station and each of the plurality of antennas of the base station;

predicting an external factor affecting each of the plurality of channels for which the channel information is estimated;

calculating a channel capacity for each of the plurality of channels for which the channel information is estimated based on each piece of the estimated channel information and the predicted external factor;

determining a combination of the plurality of channels between the plurality of antennas of the at least one mobile transceiver station and the plurality of antennas of the base station that maximizes a total channel capacity of the wireless communication established between the at least one mobile transceiver station and the base station based on each piece of the calculated channel capacity; and controlling an orientation of each of the plurality of antennas of the at least one mobile transceiver station and each of the plurality of antennas of the base station based on the determined combination, wherein the plurality of antennas of the base station are physically spaced apart from each other within a range in which communication is available with at least any one of the plurality of antennas of the at least one mobile transceiver station.

2. The wireless communication method according to claim 1, wherein the channel information for each of the plurality of channels is newly estimated in a case where the predicted external factor is updated.

3. A wireless communication system, wherein wireless communication is established between at least one mobile transceiver station provided with a plurality of antennas and a base station provided with a plurality of antennas, the system comprising:

a channel information estimation circuitry configured to estimate channel information for each of a plurality of channels between the plurality of antennas of the at least one mobile transceiver station and the plurality of antennas of the base station based on location information for each of the plurality of antennas of the at least one mobile transceiver station and each of the plurality of antennas of the base station;

an external factor prediction circuitry configured to predict an external factor affecting each of the plurality of channels for which the channel information is estimated by the channel information estimation circuitry;

a channel capacity calculation circuitry configured to calculate a channel capacity for each of the plurality of channels for which the channel information is estimated by the channel information estimation circuitry based on each piece of the channel information estimated by the channel information estimation circuitry and the external factor predicted by the external factor prediction circuitry;

a combination determination circuitry configured to determine a combination of the plurality of channels between the plurality of antennas of the at least one mobile transceiver station and the plurality of antennas of the base station that maximizes a total channel capacity of the wireless communication established between the at least one mobile transceiver station and the base station based on each piece of the channel capacity calculated by the channel capacity calculation circuitry; and an orientation control circuitry configured to control an orientation of each of the plurality of antennas of the at least one mobile transceiver station and each of the plurality of antennas of the base station based on the combination determined by the combination determination circuitry, wherein the plurality of antennas of the base station are physically spaced apart from each other within a range in which communication is available with at least any one of the plurality of antennas of the at least one mobile transceiver station.

4. The wireless communication system according to claim 3, wherein the channel information estimation circuitry newly estimates channel information for each of the plurality of channels in a case where the predicted external factor is updated by the external factor prediction circuitry.

5. A control station that controls wireless communication established between at least one mobile transceiver station provided with a plurality of antennas and a base station provided with a plurality of antennas, the control station comprising:

a channel information estimation circuitry configured to estimate channel information for each of a plurality of channels between the plurality of antennas of the at least one mobile transceiver station and the plurality of antennas of the base station based on location information for each of the plurality of antennas of the at least one mobile transceiver station and each of the plurality of antennas of the base station;

an external factor prediction circuitry configured to predict an external factor affecting each of the plurality of channels for which the channel information is estimated by the channel information estimation circuitry;

a channel capacity calculation circuitry configured to calculate a channel capacity for each of the plurality of channels for which the channel information is estimated by the channel information estimation circuitry based on each piece of the channel information estimated by the channel information estimation circuitry and the external factor predicted by the external factor prediction circuitry;

a combination determination circuitry configured to determine a combination of the plurality of channels between the plurality of antennas of the at least one mobile transceiver station and the plurality of antennas of the base station that maximizes a total channel capacity of the wireless communication established between the at least one mobile transceiver station and the base station based on each piece of the channel capacity calculated by the channel capacity calculation circuitry; and an orientation control circuitry configured to control an orientation of each of the plurality of antennas of the at least one mobile transceiver station and each of the plurality of antennas of the base station based on the combination determined by the combination determination circuitry, wherein the plurality of antennas of the base station are physically spaced apart from each other within a range in which communication is available with at least any one of the plurality of antennas of the at least one mobile transceiver station.

6. The control station according to claim 5, wherein the channel information estimation circuitry is configured to newly estimate channel information for each of the plurality of channels in a case where the predicted external factor is updated by the external factor prediction circuitry.

* * * * *